United States Patent [19]

Bethune

[11] Patent Number: 4,811,753
[45] Date of Patent: Mar. 14, 1989

[54] RECREATIONAL VEHICLE DRAIN VENT

[76] Inventor: Paul P. Bethune, P.O. Box 9, Minneola, Fla. 32755

[21] Appl. No.: 135,365

[22] Filed: Dec. 17, 1987

[51] Int. Cl.⁴ ............................................. F16K 24/00
[52] U.S. Cl. .................................. 137/217; 4/209 R; 4/211; 137/216.2; 137/899
[58] Field of Search ............... 4/209 R, 210, 211, 216, 4/218, 219; 137/216.1, 216.2, 217, 218, 899

[56] References Cited

U.S. PATENT DOCUMENTS

| | | | |
|---|---|---|---|
| 387,961 | 8/1888 | Ryan | 137/216.2 |
| 549,364 | 11/1895 | Israel | 137/216.1 |
| 933,279 | 9/1909 | Welch | 137/216.1 |
| 2,303,037 | 11/1942 | Fredrickson | 137/218 |
| 2,575,905 | 11/1951 | Boosey | 4/211 |
| 2,852,034 | 9/1958 | Shames | 137/216.2 X |
| 3,766,575 | 10/1973 | Grengs | 4/209 X |
| 3,791,401 | 2/1974 | Gorman | 137/216.2 |
| 3,894,301 | 7/1975 | Bunch | 4/211 |
| 4,185,654 | 1/1980 | Young | 137/216.2 X |

Primary Examiner—Gerald A. Michalsky
Attorney, Agent, or Firm—William M. Hobby, III

[57] ABSTRACT

A drain vent apparatus for recreational vehicles may be coupled to the drain vent of a drain line of a vehicle and includes a coupling for a drain hose for the output of the drain vent. The drain vent has an outer housing and an inner pipe located in said outer housing and connected to the coupling for the drain vent for coupling to a drain line of a vehicle. The outer housing forms an annular passageway around the inner pipe for the passage of air and a check valve is located in the outer housing passageway to allow the passage of air in one direction while blocking the passage of water in the opposite direction so that the outside vent air may pass into the drain vent to vent the drain line. The outer housing has an opening to atmosphere covered by a cap. The check valve may be mounted adjacent to the opening in the passageway adjacent the cap so that removal of the cap allows access to the check valve. The smaller inner pipe forms a venturi with the outer housing at the opening of the passageway and inner pipe to the drain hose so that air is aspirated into the drain vent.

8 Claims, 2 Drawing Sheets

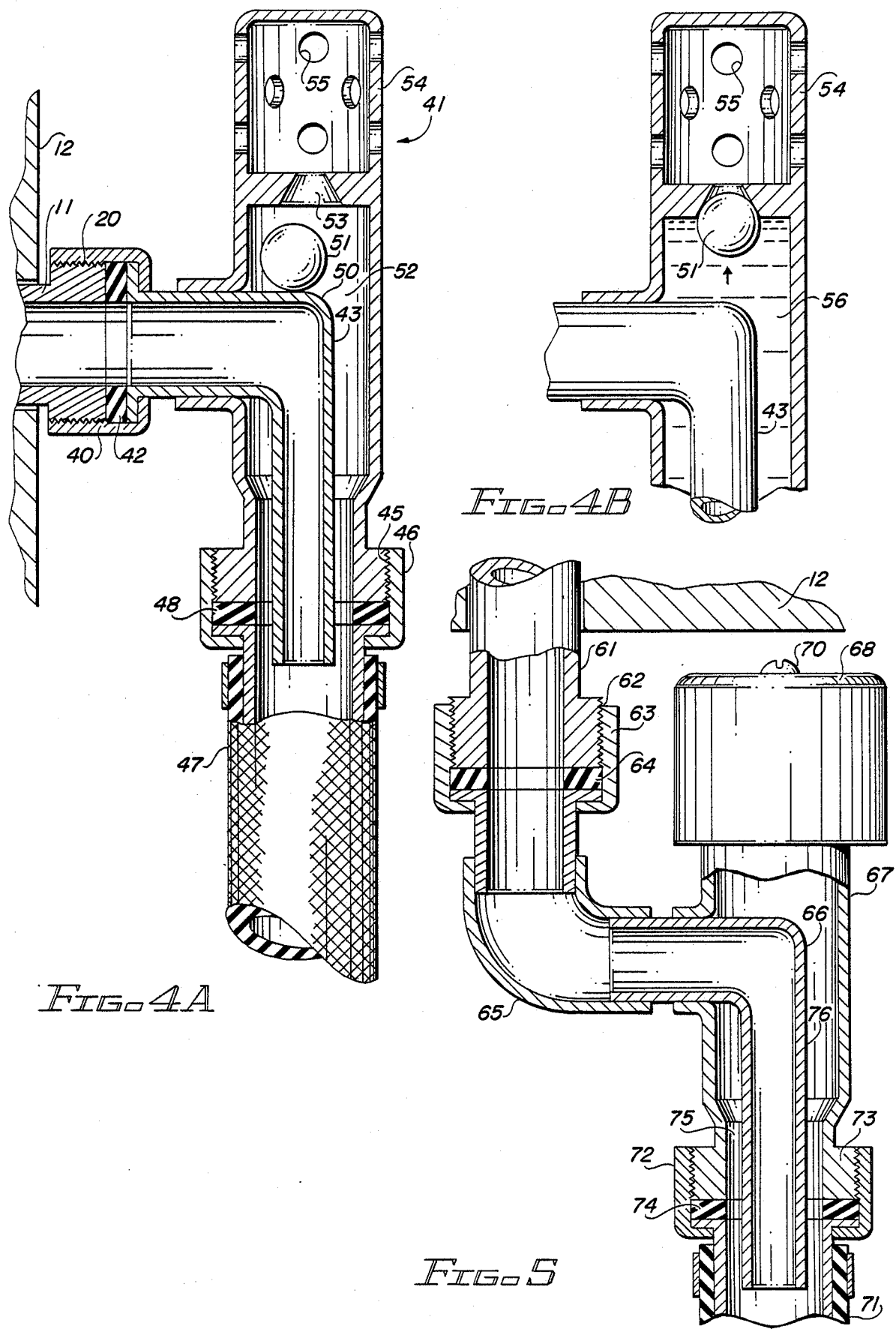

RECREATIONAL VEHICLE DRAIN VENT

The present invention relates to a drain vent and especially to a drain vent for use with recreational vehicles.

In the past, it has been common to provide plumbing fixtures in buildings with various types of vents to allow for the proper drainage into sewer lines or septic tanks. These vents typically run from a drain line through the walls to the top of the building where they are open to atmosphere. Because of the great height of the vent pipe, no special precautions have to be taken to prevent fluids being pushed out the vent pipes. In addition, since the vent pipes are normally connected to various types of drains, no precautions are needed to prevent the ingress of rainwater or the like.

In recent years the numbers and types of recreational vehicles being marketed has greatly increased. These vehicles include trailers for towing behind the vehicles as well as campers for mounting on a truck, such as a pickup truck, mobile homes, tent trailers, and expandable trailers having a rigid trailer base. These recreational trailer vehicles typically have a sink and stove and generally have sinks framed with a drain conduit passing through the wall of the vehicle adapted for connection to a hose for further conducting the sink drain water away from the vehicle. In many cases where a recreational vehicle has parked for the night, a length of ordinary garden hose is attached to the drain conduit so that the drain water will merely run out onto the ground at some convenient point a short distance away from the vehicle. In other cases, the end of the hose may be disposed so as to allow the drain water to run into a sewer line for disposing of the waste. In the case of a sewer connection, there is a possibility of unpleasant and unhealthy odors backing up through the hose into the recreational vehicle as well as the possibility of bugs and the like entering the vehicle through the drain line. Thus, it is a legal requirement for such vehicles that the sink have a trap or vertically disposed U-shaped conduit so that some water will tend to remain in the sink trap to block the free flow of gases back into the sink and that there further be provided a means for venting the sink drain line at some point downstream of the trap so that the water flowing in the drain hose will not tend to siphon the water out of the trap. It is a still further requirement that the source of vent air be such that in the ordinary course of events, drain water will be expelled only through the drain conduit and hose and not through the vent. Further, since the vent communicates with the drain system downstream of the trap, obnoxious gases may pass upward to the drain system and be expelled by the vent. The vent must communicate with the outside of the vehicle rather than the inside of the vehicle. The vent and drain commonly known and used in the prior art includes an assembly of a large number of molded plastic parts, most of which are standard plumbing components. Many of the components of the prior art vents and drains are standard and relatively inexpensive parts but a relatively large number of parts are required to be assembled to achieve the vent and drain. This makes the resulting unit more expensive than if designed using fewer parts and prior vent and drain assemblies frequently require two holes through the vehicle wall in vertical relation to each other and this limits the placement of the vent and drain because of the presence of other items such as windows. The vents are therefore sometimes eliminated in the construction of smaller units and conversions.

The present invention overcomes the disadvantages of the prior art by utilizing a drain vent which is easily attached without modification to an existing sink drain or recreational vehicle and may have a conventional garden hose connected to the output thereof for venting the drain as the drain water passes therethrough.

Prior U.S. patents relating to the present invention may be seen in the Grengs U.S. Pat. No. 3,766,575, for a vented drain for recreational vehicles and which has a drain opening passing through a circuitous passageway into the drain water leaving the sink drain prior to passing out of an opening in the vented drain. A typical home drain venting system may be seen in the Morton patent, U.S. Pat. No. 1,064,241 and in the Keller patent, U.S. Pat. No. 1,213,207. A wash basin drain can be seen in the Hartness patent, U.S. Pat. No. 971,839 while the Bunch patent, U.S. Pat. No. 3,894,301 shows an integrated drain and vent system for sinks utilizing a dual pipe system with a T-connector formed therein. The Grengs patent is directed to the same problem in the industry as the present invention but lacks a venturi for injecting the air through a negative pressure created by the venturi as well as the simple construction using a check valve to assure that no liquid escapes from the drain vent. This invention is specifically directed to those units with no provision for venting other than the sink drain itself. It requires no installation except exterior attachment to existing fittings.

SUMMARY OF THE INVENTION

A drain vent for recreational vehicles is provided having means for coupling the drain vent to a drain line of a vehicle including a threaded coupling. The drain vent has means for coupling a drain hose thereto. The drain vent has an outer housing and inner pipe located in the outer housing and connected to the means for coupling the drain vent to the drain line of the vehicle. The outer housing forms an annular passageway around the inner pipe for the passage of air and the check valve is located in the outer housing passageway to allow the passage of air in one direction while blocking the passage of water in the opposite direction so that outside vent air may pass into the drain vent to vent the drain line. The drain vent outer housing has an opening to atmosphere which is covered by a cap which allows the entrance of air and has the check valve positioned adjacent the opening and which may be easily accessed through the cap. The check valve may be a ball check valve having a floating ball on a cage adjacent the valve seat or may be a hinged floating valve element hinged to float against the valve seat or may be a flexible flap valve mounted in the housing adjacent the valve seat. The smaller pipe in the drain vent forms a venturi with the outer housing at the opening of the passageway and inner pipe to the drain hose so that air is aspirated under a negative pressure into the drain vent.

BRIEF DESCRIPTION OF THE DRAWINGS

Other objects, features, and advantages of the present invention will be apparent from the written description and the drawings in which

FIG. 4A is a sectional view of a second embodiment of the drain vent in accordance with FIGS. 1 through 3;

FIG. 4B is a sectional view showing the check valve closed;

FIG. 5 is a sectional view of another embodiment of the drain vent in accordance with FIGS. 1 through 4;

DESCRIPTION OF THE PREFERRED EMBODIMENTS

Figure 1:
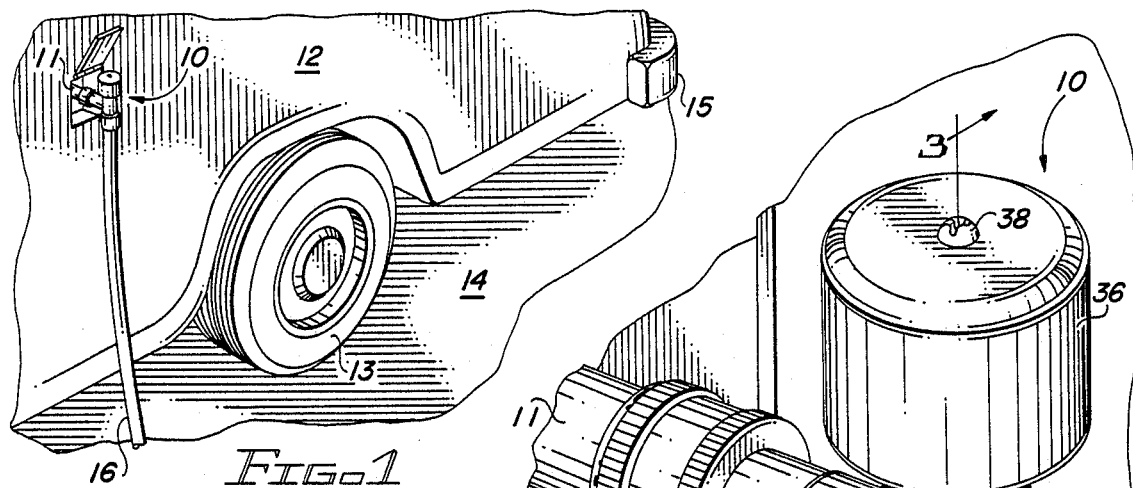
FIG. 1 is a partial perspective view of a recreational vehicle having a drain vent in accordance with the present invention attached thereto.
Figure 2:
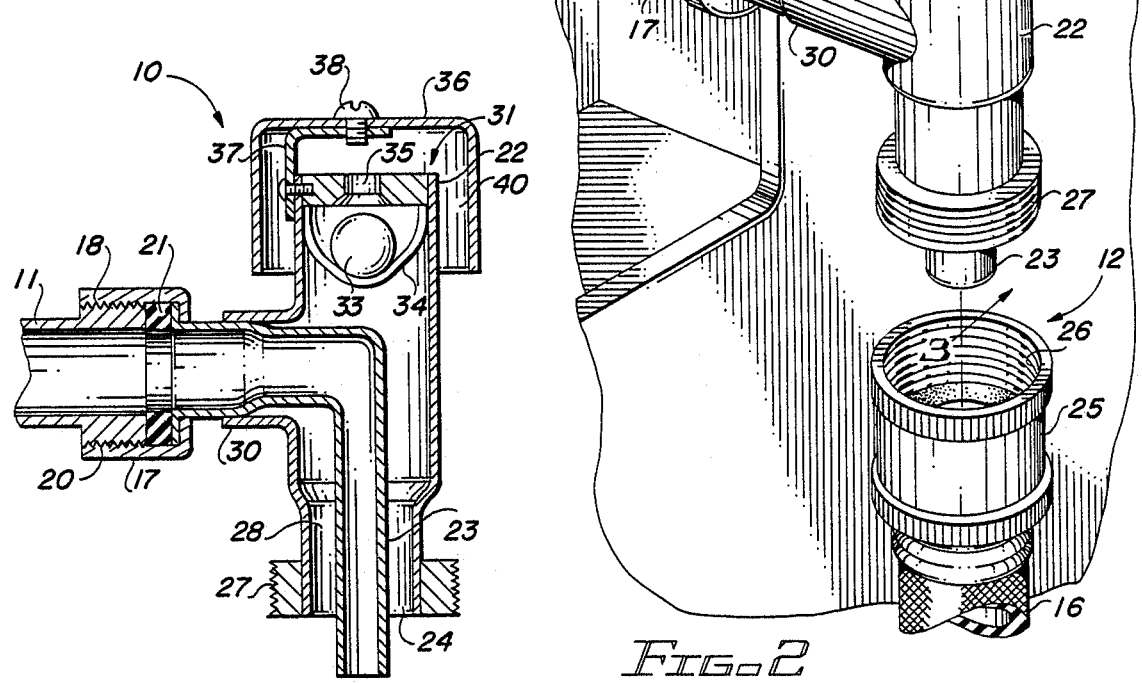
FIG. 2 is an exploded perspective view of the drain vent of FIG. 1.
Figure 3:
FIG. 3 is a sectional view taken on line 3—3 of FIG. 2.

Referring to the drawings and especially to FIGS. 1 through 3, a drain vent 10 is illustrated attached to a sink drain pipe 11 of a recreational vehicle 12. The recreational vehicle 12 has tires 13 positioned on the ground 14 and is shown having a bumper 15 attached to the back thereof. The drain vent 10 has a garden hose or drain hose 16 attached thereto for running off the drain water from the sink. In operation, the sink drain pipe 11 would normally have a hose 16 attached directly thereto but, in the present case, has the drain vent 10 attached to the sink pipe 11 and the drain hose 16 attached to the output of the drain vent 10.

As more clearly shown in connection with FIGS. 2 and 3, drain vent 10 has a coupling means 17 which may have internal threads 18 for threading onto the external threads 20 of the sink drain pipe 11 and a resilient washer 21 is used to prevent leakage of the drain liquid. An outer housing 22 may be formed of copper or other metal or plastic and has an inner pipe 23 thereinside and connected directly to the coupling 18 so that liquid being drained from the sink drain pipe 11 passes directly into the inner smaller drain pipe 23 and exits just below the mouth 24 of the outer housing 22 into the drain hose 16. Drain hose 16 has a coupling 25 having internal threads 26 and may be an ordinary garden hose if desired for coupling to the external threads 27 on the housing 22 of the drain vent 10. The inner pipe 23 passing through the outer housing 22 forms an annular passageway 28 around the pipe 23. The housing 22 is attached to the inner pipe with an annular attachment at 30 such as by soldering. Passageway 28 has a check valve 31 mounted therein adjacent opening 32 which opens the passageway 28 to the atmospheric air. Check valve 31 may have a ball 33 which is a free floating ball in a cage 34 mounted adjacent the valve seat 35. A cap 36 may be mounted to a mounting bracket 37 with a screw 38 and forms an annular passageway 40 into the opening 32 of the passageway 28 of the housing 22. Small pipe 23 passes through the housing 22 and has an opening therefrom to form an annular passageway therearound to create a venturi. The velocity of the draining liquid is increased through the pipe 23 and then exits into the larger pipe, or hose 16 to create a negative pressure to thereby aspirate air through the passageway 40 of the cap 36 through the valve seat 35 of the check valve 31, through the passageway 28 of the housing 22 and into the hose 16 to vent the draining liquid. If the hose 16 becomes stopped up or otherwise forces the liquid passing therethrough through the passageway 28, it will force the ball 34 to float into the seat 35 to block the draining liquids from exiting the drain vent 10 through the opening 32 and around the cap 36. Thus, the drain vent 10 is compact and can be readily attached to the drain pipe 11 and have a garden or drain hose 16 attached to the coupling threads 27. The drain vent is enhanced by the venturi formed by the narrowing of the passageway for the liquid and then opening up the passageway. The check valve acts as a safety feature against the leakage of drainage fluids.

Turning to FIGS. 4A and 4B, the recreational vehicle 12 has the sink drain pipe 11 having an externally threaded coupling 20 for coupling into a threaded coupling 40 of an alternate embodiment of a drain vent 41. Coupling 40 also has a flexible washer 42 therein and has an internal drain pipe 43 extending partially through an outer housing 44. A threaded coupling 45 allows a threaded coupling 46 of a hose 47 to be rapidly coupled to the drain vent 41 and a resilient washer 48 may be mounted therein to prevent leakage therethrough. This embodiment works similar to the embodiment of FIGS. 1 through 3 except the housing forms a check valve cage by the top ledge 50 of the inner pipe 43 holding a floating ball 51 in the passageway 52 adjacent the valve seat 53. The check valve is formed as part of the drain vent 41 and the cap of FIGS. 1 through 3 is replaced with a fixed end portion 54 having a plurality of side openings 55 therein. If liquid backs up in passageway 52, the ball 51 floats as shown in FIG. 4B to fit into the coned shaped valve seat 53 to block off the valve seat and prevent the escape of the liquid 56.

FIG. 5 shows yet another embodiment of a drain valve 60 mounted to the bottom of a recreational vehicle 12 having a bottom drain pipe 61 with a threaded coupling 62 for coupling the drain vent coupling 63 thereto and has a washer 64 therein. Drain vent 60 has an elbow 65 for directing the drain liquid into the inner pipe 66 mounted in the housing 67. A cap 68 is mounted as shown in FIGS. 1 through 3 with a screw 70 and the drain hose 71 has a threaded coupling 72 attached to the exterior threaded coupling 73 of the housing 67 and a washer 74 can seal the threaded couplings 72 and 73 together. The venturi is increased by the narrowing passageway 75 which is further narrowed by the passage of the smaller fluid pipe 76.

Figure 6:
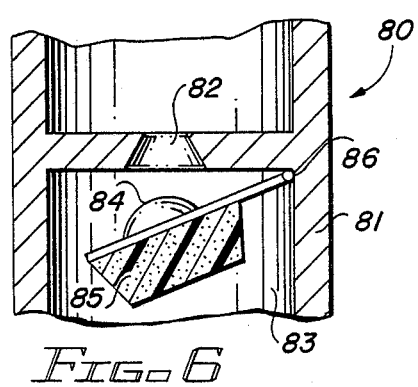
FIG. 6 is a sectional view of an alternate check valve.

Turning to FIG. 6, an alternate embodiment of a check valve 80 is illustrated in which the housing 81 has a valve seat 82 formed therein in the passageway 83 and has a valve element 84 with flotation material 85 mounted thereto and hinged with a hinge 86. Valve element 84 is closed by the liquid floating the flotation material 85 to force the valve element 84 into the valve seat 82.

Figure 7:
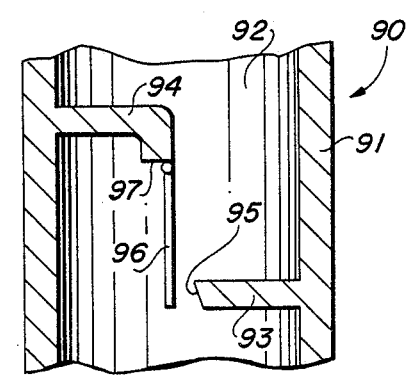
FIG. 7 is yet another embodiment of a check valve for use on a drain vent in accordance with the present invention.

FIG. 7 illustrates yet one more check valve 90 having a housing 91 with a passageway 92 therethrough and a partial wall 93 spaced from a partial wall 94 to form the valve seat through the passageway 94 between the wall portions 93 and 94. A flexible flap valve 96 is attached to a lip 97 of the wall 94 and remains open as shown in FIG. 7 but will be closed by the pressure of a liquid pressing thereagainst trying to escape through the passageway 92 through the opening 95.

It should be clear at this point that a drain vent system for a recreational vehicle has been provided which is simple in construction and can be readily attached to most drain pipes of recreational vehicles and which increases the venting by the utilization of a venturi and simultaneously uses a check valve to prevent the escape of drain fluids to thereby reduce the size and complexity of the drain vent. However, the present invention is not to be considered limited to the forms shown which are to be considered illustrative rather than restrictive.

I claim:

1. A drain vent for recreational vehicles comprising:
   a drain vent;
   means for coupling said drain vent to a drain line of a vehicle;
   means for coupling a drain hose to said drain vent;
   said drain vent having an outer housing and an inner drain pipe located in said outer housing and being connected to said means for coupling said drain vent to said drain line of said vehicle whereby said drain line passes directly through said drain vent;
   said outer housing forming an annular passageway around said inner drain pipe for the passage of air;
   said inner drain pipe protrudes into a narrowed passageway formed by said outer housing to form a venturi with said outer housing at the opening of the passageway and inner drain pipe to said drain hose whereby air is aspirated into the drain vent;
   said outer housing having an opening to atmosphere therefrom and having a cap covering said housing opening;
   a bracket mounted to said outer housing adjacent the opening therein for mounting said cap; and
   a check valve located in said outer housing passageway to allow the passage of air in one direction while blocking the passage of water in the opposite direction; whereby outside vent air may pass into said drain vent to vent said drain line.

2. A drain vent for recreational vehicles in accordance with claim 1 in which said check valve is mounted adjacent to the opening in said housing passageway.

3. A drain vent for recreational vehicles in accordance with claim 2 in which check valve has a valve seat and a free floating ball valve member in a cage whereby liquid will push said ball into the valve seat.

4. A drain vent for recreational vehicles in accordance with claim 2 in which check valve has a hinged floating valve element hinged in said housing passageway and positioned to close onto a valve element.

5. A drain vent, for recreational vehicles in accordance with claim 2 in which said check valve is a flexible flap valve mounted in said housing passageway.

6. A drain vent for recreational vehicles in accordance with claim 2 in which cap is removably held to said bracket with a screw thereby allowing access to said check valve.

7. A drain vent for recreational vehicles in accordance with claim 2 in which said means for coupling said drain vent to a drain line of a vehicle includes an internal threaded coupling.

8. A drain vent for recreational vehicles in accordance with claim 7 in which said means for coupling a drain hose to said drain vent includes an external threaded coupling on said drain vent.

* * * * *